United States Patent
Thomas et al.

(10) Patent No.: US 7,488,364 B1
(45) Date of Patent: Feb. 10, 2009

(54) LAYERED DISPOSABLE AIR FILTER WITH DUST CAPTURE TOPOLOGY

(75) Inventors: Jeff David Thomas, Raleigh, NC (US); Paul Daniel Kangas, Raleigh, NC (US); Dean Frederick Herring, Youngsville, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 12/182,234

(22) Filed: Jul. 30, 2008

(51) Int. Cl.
*B01D 46/00* (2006.01)

(52) U.S. Cl. .................. 55/482; 55/385.1; 55/385.6; 55/486; 55/495; 55/524; 95/273; 95/285; 95/287

(58) Field of Classification Search ............ 55/382, 55/385.1, 385.4, 385.6, 482, 486, 487, 495, 55/501, 524, 527, 528, DIG. 31; 95/273, 95/285, 286, 287; 454/66; 442/414
See application file for complete search history.

(56) References Cited

U.S. PATENT DOCUMENTS

| | | | | |
|---|---|---|---|---|
| 2,650,269 | A * | 8/1953 | Webb | 55/486 |
| 2,809,715 | A * | 10/1957 | Lemkey | 55/486 |
| 4,340,402 | A * | 7/1982 | Catron | 55/487 |
| 4,647,373 | A * | 3/1987 | Tokar et al. | 55/521 |
| 4,793,922 | A * | 12/1988 | Morton | 55/486 |
| 4,826,597 | A * | 5/1989 | Silverwater et al. | 55/487 |
| 4,889,542 | A * | 12/1989 | Hayes | 55/385.6 |
| 5,421,862 | A * | 6/1995 | Davis | 95/273 |
| 5,490,336 | A * | 2/1996 | Smick et al. | 55/385.1 |
| 5,912,369 | A | 6/1999 | Reeves | |
| 6,171,354 | B1 * | 1/2001 | Johnson | 55/385.1 |
| 6,296,691 | B1 | 10/2001 | Gidumal | |
| 6,800,106 | B2 * | 10/2004 | Cogar et al. | 55/385.6 |
| 6,840,387 | B2 * | 1/2005 | Beer et al. | 55/487 |
| 7,291,208 | B2 | 11/2007 | Dauber et al. | |
| 2008/0022645 | A1 * | 1/2008 | Skirius et al. | 55/524 |
| 2008/0115473 | A1 | 5/2008 | Miller | |

* cited by examiner

*Primary Examiner*—Jason M Greene
(74) *Attorney, Agent, or Firm*—Jason O. Piche; Suiter Swantz pc llo

(57) ABSTRACT

An apparatus for air filtration comprises a substrate, the substrate including a first side and a second side, a plurality of openings in the substrate, each opening in the plurality of openings including a tapered edge from the first side to the second side, a plurality of layers of filter material removably attached to the substrate, the plurality of layers of filter material further including: an exposed layer and at least one subsequent layer, a plurality of openings in the plurality of layers, each opening of the plurality of openings corresponding to the openings in the substrate, an extension of the layers of filter material into the tapered edge of the openings in the substrate, the extension extends at least to the second side of the openings in the substrate, and a particulate trapping adhesive attached to the first side of each layer of the filter material.

1 Claim, 6 Drawing Sheets

LAYERED DISPOSABLE AIR FILTER WITH DUST CAPTURE TOPOLOGY

TECHNICAL FIELD

The present disclosure generally relates to the field of air filtration, and more particularly to an air filter with removable layers of adhesive particle collection material.

BACKGROUND

Air ventilation inlets, exposed to continuous air flow, may tend to become a collection point for dust and debris. Particles of foreign material collecting at the inlet area may lead to decreased airflow through the inlet and a reduction in total cooling efficiency. Less than desired cooling of an operating unit (e.g., a computer processor) may lead to decreased overall performance and less than desired results. Cleaning soiled inlet areas requires time and a possible shut down of a system for completion. Prior art filtration devices placed upstream of an air inlet achieve the desired result of keeping the air inlet clean but lack both the convenient layered aspect and the ability to be easily maintained or replaced.

SUMMARY

The present disclosure is directed to an apparatus for air filtration comprising a substrate, the substrate including a first side and a second side, a plurality of openings in said substrate, each opening in said plurality of openings including a tapered edge from the first side to the second side, a plurality of layers of filter material removably attached to the substrate, the plurality of layers of filter material further including: an exposed layer and at least one subsequent layer, a plurality of openings in said plurality of layers, each opening of said plurality of openings corresponding to the openings in the substrate, an extension of said layers of filter material into the tapered edge of the openings in the substrate, the extension extends at least to the second side of the openings in the substrate, and a particulate trapping adhesive attached to the first side of each layer of said filter material.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
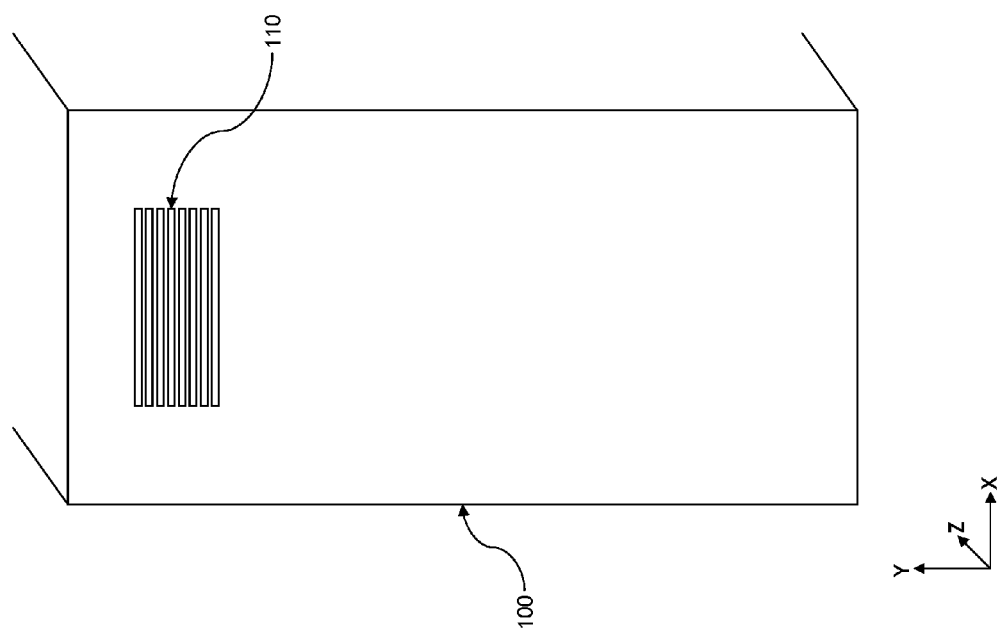
FIG. 1 illustrates a housing unit with rectangular air ventilation inlets.
Figure 2:
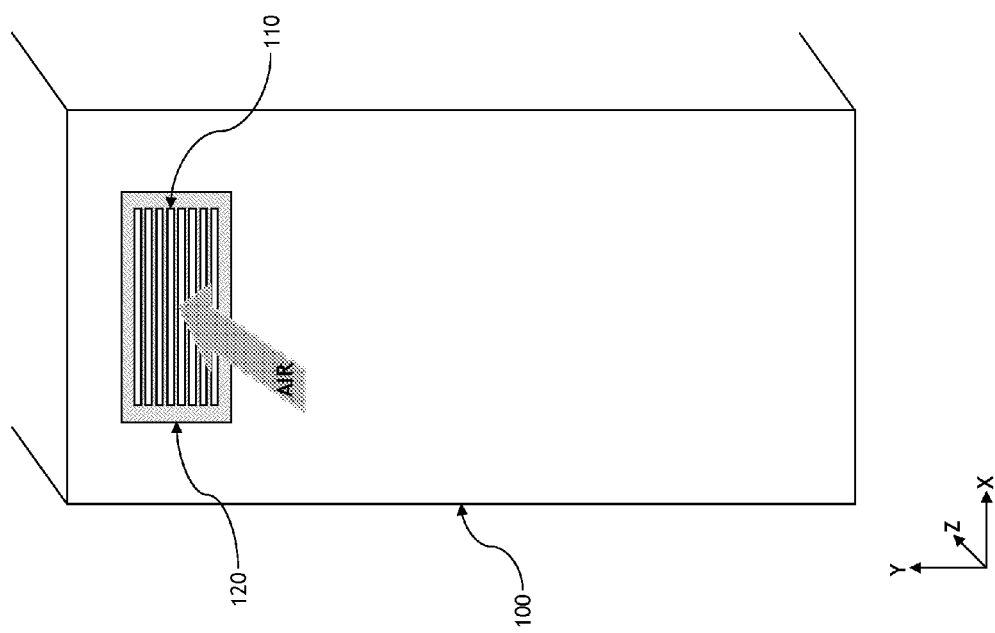
FIG. 2 shows the same housing unit and air ventilation inlets covered by an embodiment of the present filter invention.
Figure 3:
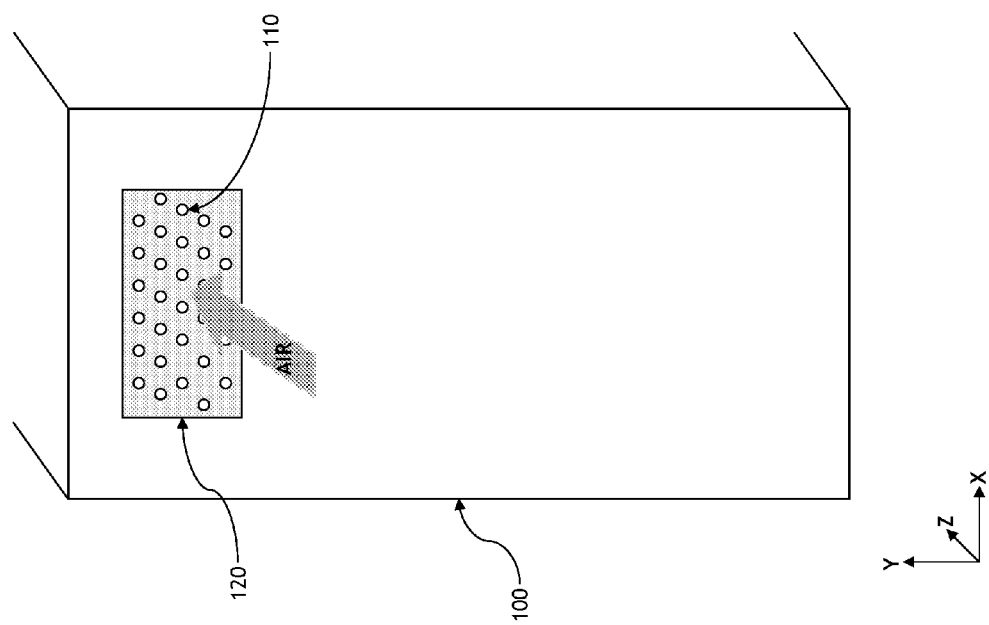
FIG. 3 illustrates an alternate geometry of an embodiment of the present invention covering circular inlets.
Figure 4:
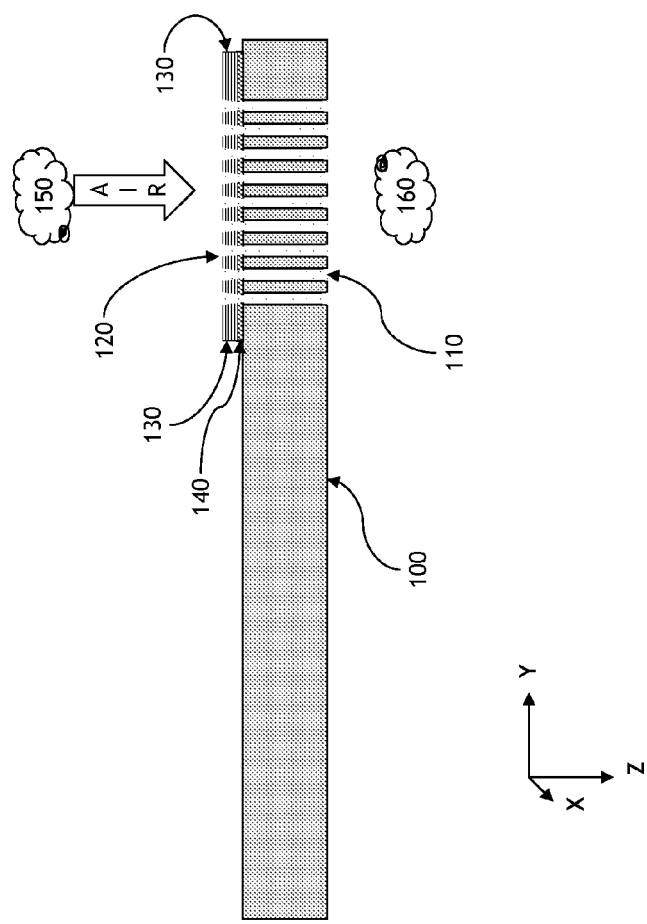
FIG. 4 illustrates a cross section of an embodiment of the current invention showing air vents of a housing unit covered by the present invention filter.

Referring to FIG. 1, an embodiment of the present invention may attach to a housing 100 of a unit to be cooled. The housing may include a plurality of uniformly spaced openings used for air ventilation 110 allowing for cooling air to flow from outside the housing to inside. Referring to FIG. 2, one embodiment of the present invention filter 120 may be adhesively attached to the exterior side of an air inlet (e.g., the exterior side of a computer case air vent). Filtered air inlets may be of any shape as an additional embodiment of circular air inlets is shown in FIG. 3. Referring to FIG. 4, an embodiment of the present disclosure detailing a cross section of the air inlet of the housing 100 is shown. The air inlet area includes a first side 150 and a second side 160. The filter 120 is adhesively attached to the first side 150 of the air inlet vent and includes a substrate 140 and a plurality of disposable, peel-off layers of filter material 130. Air passes the filter material 130 upstream of the ventilation inlet opening 110.

Figure 5:
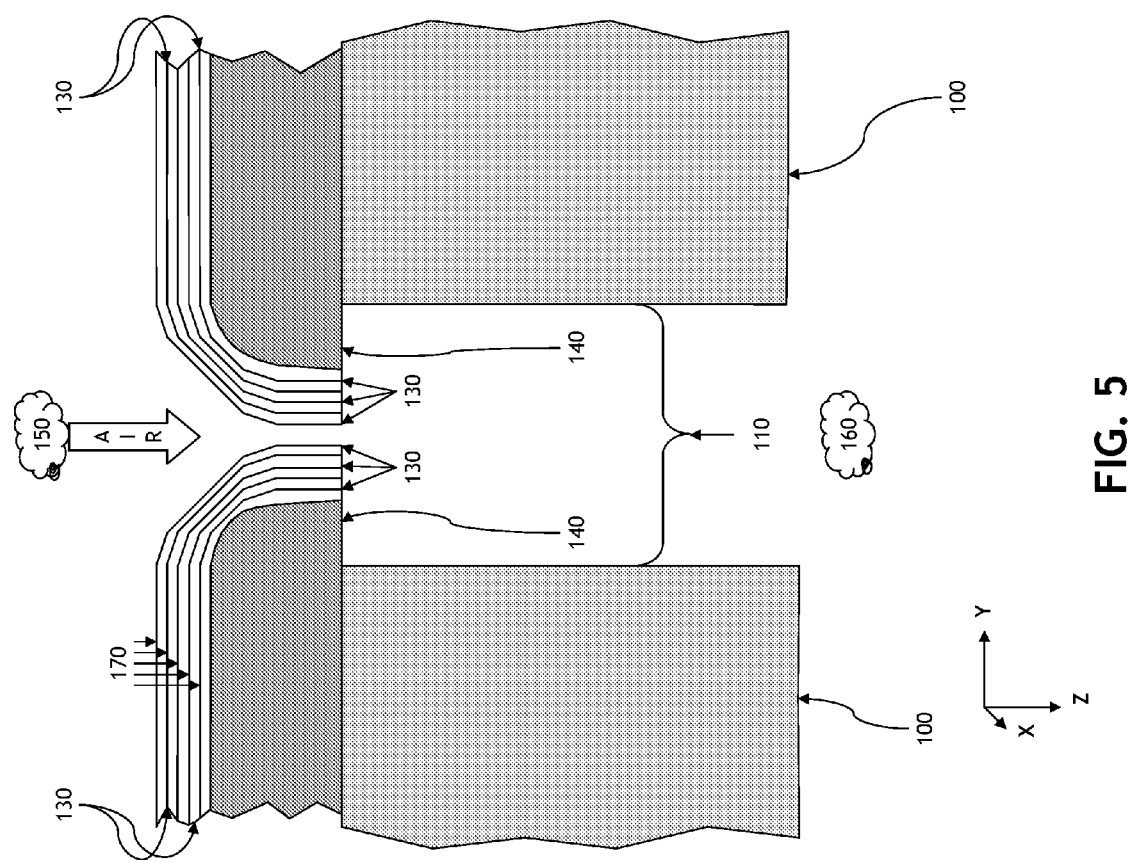
FIG. 5 is an expanded view of a cross section of one embodiment of the present invention illustrating a housing of a unit, a substrate, and a layered filter attached to the substrate.

Referring to FIG. 5, a cross section detailed view of an embodiment of the current invention is shown. Airflow passing through an air vent inlet 110 is filtered using a substrate 140 covered with layers of peel-off filter material 130. Preferably, the present invention includes the capture of large dust particles that could clog either an exterior vent of a system unit or a heat sink internal to the unit. Each layer of filtered material is attached to the next layer using a debris attracting adhesive 170. Air flows from the first side 150 of the air inlet 110 to the second side 160. Preferably, the substrate 140 and filter material 130 extend into the opening of the substrate to at least the second side of the substrate creating a funneling topology to increase surface area available to the adhesive surface 170.

Figure 6:
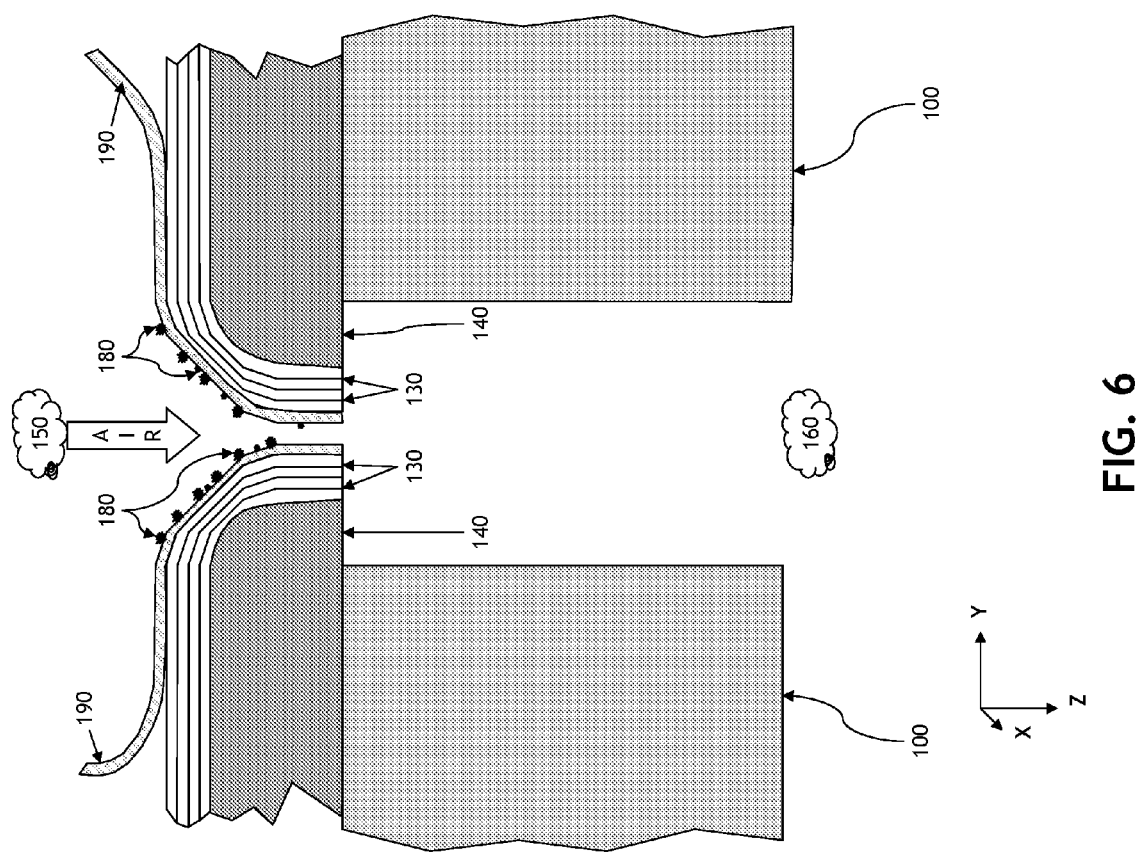
FIG. 6 illustrates an application of an embodiment of the current disclosure showing accumulated particulate matter attached to adhesive material of the filter.

Referring to FIG. 6, illustration of an application of an embodiment of the current disclosure is shown. Particulate debris 180 are captured by the exposed layer of the adhesive filter material 190 as air flows through the air inlet. The exposed layer of filter material 190 may then be peeled off from the subsequent layers to reveal a subsequent fresh layer 130 for use.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

The form described is merely explanatory, and it is the intention of the following claims to encompass and include such changes.

What is claimed is:

1. An apparatus for air filtration comprising:
   a substrate, the substrate including a first side and a second side;
   a plurality of openings in said substrate, each opening in said plurality of openings including a tapered edge from the first side to the second side;
   a plurality of layers of filter material removably attached to the substrate, the plurality of layers of filter material further including:
   an exposed layer and at least one subsequent layer,
   a plurality of openings in said plurality of layers, each opening of said plurality of openings corresponding to the openings in the substrate;
   an extension of said layers of filter material into the tapered edge of the openings in the substrate, the extension extends at least to the second side of the openings in the substrate; and
   a particulate trapping adhesive attached to the first side of each layer of said filter material.

* * * * *